United States Patent [19]

Rumble

[11] 4,087,120
[45] May 2, 1978

[54] PIPE COUPLING WITH A WEDGING CONTRACTILE RING

[75] Inventor: Edgar B. Rumble, Girard, Ohio

[73] Assignee: Michigan Pipe Fittings Company, Div. of Michigan Hanger Co. Inc., Hubbard, Ohio

[21] Appl. No.: 767,456

[22] Filed: Feb. 10, 1977

Related U.S. Application Data

[63] Continuation-in-part of Ser. No. 696,508, Jun. 16, 1976, abandoned.

[51] Int. Cl.² .............................................. F16L 35/00
[52] U.S. Cl. ..................................... 285/39; 285/105; 285/308; 285/321; 285/369
[58] Field of Search ............... 285/104, 105, 348, 321, 285/39, 369, 308, 315

[56] References Cited

U.S. PATENT DOCUMENTS

| 2,111,956 | 3/1938 | Baldwin | 285/105 |
| 2,127,086 | 8/1938 | McGrath | 285/105 |
| 2,479,960 | 8/1949 | Osborn | 285/104 |
| 3,600,010 | 8/1971 | Downs | 285/321 |

FOREIGN PATENT DOCUMENTS

| 237,391 | 4/1964 | Germany | 285/105 |
| 2,258,950 | 12/1972 | Germany | 285/321 |
| 371,931 | 9/1963 | Switzerland | 285/321 |

*Primary Examiner*—Dave W. Arola
*Attorney, Agent, or Firm*—Shoemaker and Mattare, Ltd.

[57] ABSTRACT

A pipe coupling for releasably securing pipes in end to end relation uses controlled wedging action of contractile rings positioned between the coupling and the ends of the pipes. The pipes are disengagable from the coupling through the use of a tool inserted between the pipe and the coupling and simultaneously moving the pipe inwardly of the coupling so as to reposition the contractile rings.

5 Claims, 2 Drawing Figures

PIPE COUPLING WITH A WEDGING CONTRACTILE RING

This is a continuation-in-part of application Ser. No. 696,508, filed June 16, 1976 and now abandoned.

BACKGROUND OF THE INVENTION (1) Field of the Invention:

This invention relates to pipe couplings for connecting two pipe sections to one another.

(2) Description of the Prior Art:

Prior structures of this type have employed various arrangements of contractile rings, split locking rings and movable resilient rings and the like. See for example U.S. Pat. Nos. 3,151,891, 2,950,132, 3,027,179 and 3,600,010. Still other arrangements of resilient locking and sealing rings may be seen in U.S. Pat. Nos. 2,991,091 and 3,534,776.

This invention eliminates the problems which have existed in the prior art devices and specifically with respect to the inability of the distortable or compressible sealing and locking rings to retain a coupling in secured position under working pressures and the like.

The present invention also eliminates the problems with the split metal contractible rings of the prior art devices which were difficult to operate particularly in releasing the pipe from the coupling.

SUMMARY OF THE INVENTION

A pipe coupling with a controlled wedging action contractible ring takes the form of a coupling adapted to receive the ends of sections of pipe therein to join the same to one another and has annular grooves inwardly from the ends of the coupling defining circumferentially tapered channels in which contractible rings are disposed and arranged so that forces tending to separate the pipes and the couplings will move the contractible rings axially along the tapered surface of the channels in the coupling into locking engagement with grooves around the pipe sections. Moving the pipe sections inwardly of the opposite ends of the coupling and inserting tools between the pipe sections and the coupling and engaging the contractible rings in the areas of the circumferentially tapered channels causes the contractible rings to be expanded therein sufficiently to permit the pipe sections to be withdrawn from the coupling.

DESCRIPTION OF THE PREFERRED EMBODIMENT

Figure 1:
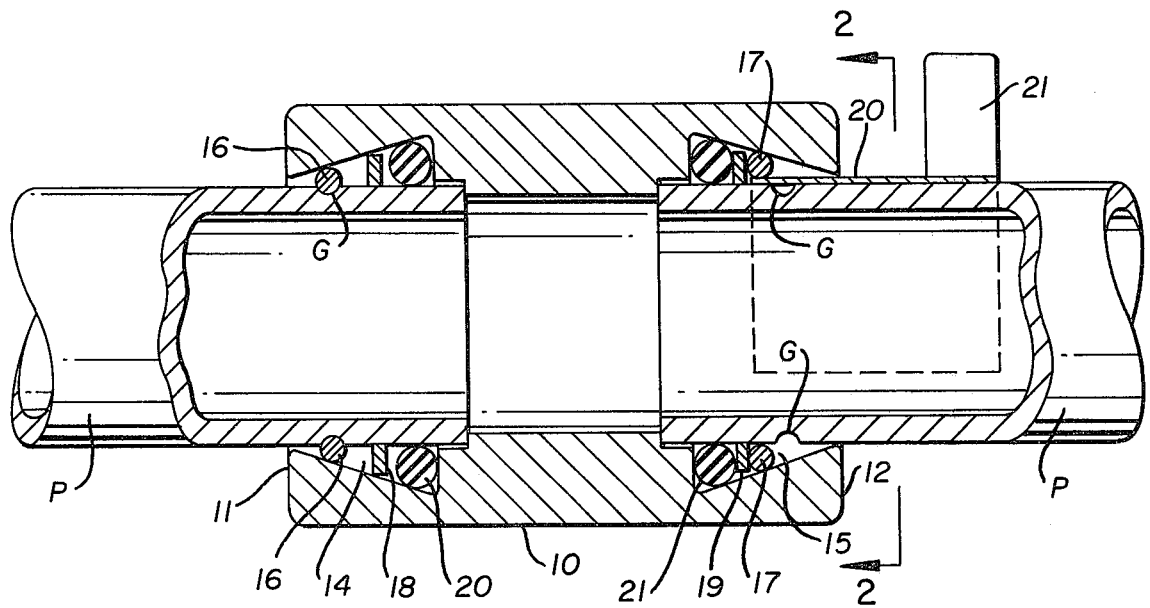
FIG. 1 is a longitudinal cross section of a pipe coupling with sections of pipes engaged therein showing in the left hand side the contractible rings in locked position and in the right hand side the contractible rings moved to unlocked position by a tool.

By referring to FIG. 1 of the drawings the invention may be seen to include a coupling body member 10 which is tubular with the end portions 11 and 12 thereof of the same outer diameter.

Circumferentially tapered channels 14 and 15 are formed inwardly of the ends 11 and 12 of the coupling body member 10 and are adapted to receive contractible, non-compressible metal rings 16, 17, 18 and 19 and sealings gaskets 20 and 21 respectively.

A pair of pipe sections P are shown extending into the coupling body member 10, each of the sections of pipe P are provided with annular grooves G in which a pair of the contractible, non-compressible cross sectionally round metal rings 16 and 17 are normally disposed as seen in the left end portion of FIG. 1 of the drawings. It will be observed that fluid pressure in the coupling and the pipes P will tend to urge the pipes P outwardly of the ends of the coupling body member 10 and thereby cause the contractible rings 16 and 17 to move into the smaller areas of the circumferentially tapered channels 14 and 15 and thus securely lock the pipe sections P into the coupling body member 10. The contractible rings 16 and 17 are circular in shape and they are split so that they may be expanded circumferentially so as to be moved into the larger areas of the circumferentially tapered channels 14 and 15 as hereinafter described in order that the pipe sections P may be released from the coupling body member 10 when desired.

It will thus be seen that in locked position as seen in the left hand portion of FIG. 1 the contractible split ring 16 is normally engaged in the external circumferential groove G in the pipe section P and wedged into the circumferentially tapered channel 14 which defines a frusto-conical bottom.

Still referring to FIG. 1 of the drawings it will be seen that a second pair of split rings 18 and 19, preferable rectangular in cross section, are positioned in the tapered channels 14 and 15 between the contractible rings 16 and 17 and the sealing gaskets 20 and 21 respectively. The split rings 18 and 19 act to separate the rings 16 and 17 from the gaskets 20 and 21 respectively and due to their rectangular shape additionally secure the coupling body 10 to the pipes P as seen in the left hand portion of FIG. 1 of the drawings.

So that the pipe sections P can be released from the coupling body member 10 if and when desired, it is necessary to move the pipe sections P inwardly of the coupling as seen in the right hand end of FIG. 1 of the drawings. In this portion of FIG. 1 the contractible ring 17 is shown disengaged from the circumferential groove G in the pipe section P by the action of moving the pipe section P inwardly of the end 12 of the coupling 10 to the left in FIG. 1 and simultaneously inserting a tool taking the form of a thin sleeve 20 which sleeve defines about three-quarters of a circle and is provided with a perpendicular handle 21. The circumference of the thin sleeve 20 is comparable with the exterior circumference of the pipe sections P so that it can be positioned thereon and slid inwardly of the end of the coupling body member 10 and into the circumferentially tapered channel 15 so that its innermost end will engage between the contractible ring 17 and the outer surface of the pipe section P and move it sufficiently and to a different area thereof to disengage the circumferential groove G whereupon the section of pipe P may be pulled outwardly of the coupling body member 10.

Figure 2:
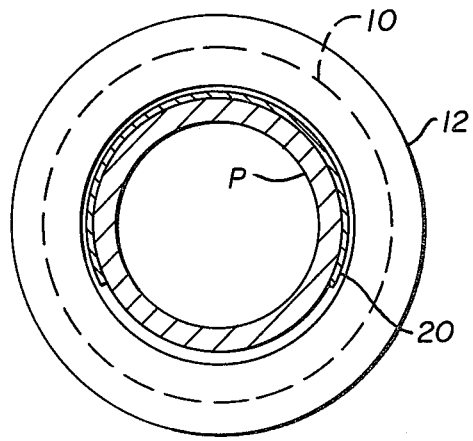
FIG. 2 is a vertical section on line 2—2 of FIG. 1.

In FIG. 2 of the drawings, the cross section of the thin sleeve 20 clearly indicates its relatively small thickness and its ability to slide into the area between the exterior surface of the pipe section P and the inner surface of the coupling body member 10 and into the circumferential tapered channel 15.

It will occur to those skilled in the art that when the contractible ring 21 is seated in the circumferential groove G formed in the pipe P, pressure forces within the coupling and the pipe results in the shear loading of the contractible ring and it is therefore necessary that the material of the ring be functionally incompressible such as a suitable metal or a very hard plastic material.

It will thus be seen that a pipe coupling has been disclosed which may be relatively easily and inexpensively formed and more importantly easily assembled to join pipe sections which are modified only by the formation of the circumferential grooves in their outer surfaces near their ends. The resulting coupling is capable of distortion and remains sealed and fluid tight under varying pressure conditions and is particularly suitable for use in the formation of fire extinguishing sprinkler systems and the like.

Although but one embodiment of the present invention has been illustrated and described, it will be apparent to those skilled in the art that various changes and modifications may be made therein without departing from the spirit of the invention and having thus described my invention what I claim is.

I claim:

1. A readily separable coupling for joining partially telescoped pipes and the like having circumferential grooves on their exterior surfaces, said coupling having a longitudinal axis and a central portion having an inner diameter greater than the inner diameter of the pipes but less than the outer diameter of the pipes, a pair of first grooves defined in the inner surface of said coupling adjacent said central portion and having an inner diameter greater than the inner diameter of said central portion to define shoulders on said central portion, the inner ends of said pipes abutting said shoulders when the pipes are fully received in said coupling, with a portion of the pipe ends extending inwardly of said central portion to be pressurized by fluid in said coupling said coupling having a circumferentially tapered channel in its inner surface inwardly of each of its ends, each of said channels having a tapered side wall arranged so that the smallest diameter of the tapered channel is adjacent the end of the coupling and a back wall which is integral with said coupling and immovable with respect thereto and is essentially perpendicular to said coupling longitudinal axis, said tapered side walls being located to be spaced apart from the exterior surfaces of the pipes to define first gaps adjacent said coupling ends and second gaps adjacent said back walls, a first pair of cross sectionally round, contractible split rings of a inner diameter fitting within the circumferential grooves of the pipes and a thickness greater in size than said first gaps but smaller in size than said second gaps, said first pair of split rings being jammed against said tapered side walls by movement of the pipes outwardly of said coupling caused by fluid pressure in said coupling exerting force on the pipe inner ends, said jamming of said first pair of split rings against said tapered side wall securely locking the pipes into said coupling, and a second pair of cross sectionally rectangular split rings of a diameter fitting within the circumferentially tapered channels in abutting relation to said pipes and being sized to abut an adjacent tapered wall when mounted on said pipes to additionally secure said pipes in said coupling, sealing means in said tapered channels engaging said pipes and said coupling in sealing relation to prevent fluid from reaching said first pair of split rings, and means for moving the first pair of split rings substantially out of said circumferential grooves and into said circumferentially tapered channels and holding said second pair of split rings away from said smallest diameters of said circumferentially tapered channels to release the pipes from said coupling.

2. The separable coupling set forth in claim 1 and wherein said split rings in each of said channels are adjacent one another and the sealing means are positioned inwardly of the coupling with respect to said split rings.

3. The separable coupling set forth in claim 1 and wherein said means is a tool having a thin sleeve corresponding in size and shape with a substantial area of the exterior of said pipe.

4. The separable coupling set forth in claim 1 and wherein said second pair of cross sectionally rectangular split rings are distortable whereby they may move to a position in said channels with their annular edges engaging said channels and said pipes respectively in a locking action.

5. The separable coupling set forth in claim 1 and wherein said sealing means comprises O-rings having cross sectional diameters comparable with the largest diameter of the tapered channels and positioned in said separable coupling in said tapered channels in the largest areas thereof.

* * * * *